United States Patent [19]

Amano et al.

[11] Patent Number: 4,734,562
[45] Date of Patent: Mar. 29, 1988

[54] ELECTRIC TOASTER OVEN

[75] Inventors: Kazunori Amano; Yoichi Sekigawa; Nobuyuki Kojima; Shigeki Yamaguchi, all of Kamo, Japan

[73] Assignee: Toshiba Heating Appliances Co., Ltd., Kamo, Japan

[21] Appl. No.: 887,269

[22] Filed: Jul. 21, 1986

[30] Foreign Application Priority Data

Jul. 25, 1985 [JP] Japan ................... 60-164623
Oct. 3, 1985 [JP] Japan ................... 60-220571
Oct. 3, 1985 [JP] Japan ................... 60-220572
Feb. 18, 1986 [JP] Japan ................... 61-33630

[51] Int. Cl.⁴ ............................ H05B 1/02
[52] U.S. Cl. .............................. 219/413; 219/412; 219/386; 219/405
[58] Field of Search ............... 219/412, 413, 414, 385, 219/386, 387, 405, 411, 522, 398, 399; 236/42, 99 D, 99 R; 374/129, 178, 208, 121; 357/28

[56] References Cited

U.S. PATENT DOCUMENTS

| | | | |
|---|---|---|---|
| 2,631,523 | 3/1953 | Olving | 219/502 |
| 3,015,712 | 1/1962 | Dills | 236/99 D |
| 3,024,344 | 3/1962 | Dills | 219/413 |
| 3,027,444 | 3/1962 | Weeks | 219/413 |
| 3,059,088 | 10/1962 | Eff | 219/414 |
| 3,604,957 | 9/1971 | Satula | 374/178 |
| 4,611,930 | 9/1986 | Stein | 374/121 |
| 4,645,909 | 2/1987 | Thoben | 219/385 |

FOREIGN PATENT DOCUMENTS

| | | | |
|---|---|---|---|
| 2413210 | 10/1975 | Fed. Rep. of Germany | 374/129 |
| 57-198928 | 12/1982 | Japan | 219/386 |
| 1084263 | 9/1967 | United Kingdom | 374/121 |
| 2052739 | 1/1981 | United Kingdom | 236/42 |

Primary Examiner—Clifford C. Shaw
Assistant Examiner—Teresa J. Walberg
Attorney, Agent, or Firm—Flehr, Hohbach, Test, Albritton & Herbert

[57] ABSTRACT

An electric toaster oven for use both as a toaster and as an oven, including a heater or heaters for heating an article placed in a baking chamber, a baked condition detector which detects the baked condition of the article through the detection of the heat radiated from the article, a plate forming part of the wall of the baking chamber and having a heat guide opening for transferring the heat radiated from the article therethrough to the baked condition detector, a tubular guide for guiding the heat to the baked condition detector, and a control circuit which controls supplying current to the heater or heaters on the basis of a detection signal provided by the baked condition detector. The baked condition detector includes a pair of thermosensitive elements disposed in different thermal conditions, respectively, and provides a signal corresponding to the difference between the respective temperature-dependent output signals of the thermosensitive elements. The heat guide opening is opened only when the electric toaster oven is used as a toaster, or the baked condition detector is placed opposite to the heat guide opening only when the electric toaster oven is used as a toaster.

9 Claims, 25 Drawing Figures (A)

(C)

(B)

(D)

ELECTRIC TOASTER OVEN

BACKGROUND OF THE INVENTION

1. Field of the Invention

The present invention relates to an electric toaster oven for toasting sliced bread and the like.

2. Description of the Prior Art

Conventional electric toaster ovens are classified into a group of those in which the intensity of current supplied to the heater is controlled on the basis of the result of detection of the temperature of the baking chamber with a thermostat or a thermister and a group of those in which the duration of current supply to the heater is controlled by setting a timer beforehand. These conventional toaster ovens are able to toast slices of bread in a satisfactory condition at the first toasting cycle. However, since the temperature of the toasting chamber rises as the toasting cycle is repeated successively, the toasting condition varies and hence the toaster ovens are unable to toast slices of bread in a desired condition.

As is generally known in the electric toaster oven manufacturing industry, a thermostat and a control unit for controlling the operation of the toaster oven for use as a toaster or as an oven are incorporated into the toaster oven. U.S. Pat. No. 3,119,000, for example, discloses a control unit for controlling the toaster oven for use as a toaster or as an oven. This control unit is installed in the lower part of the front of a toaster oven and a door of the baking chamber is placed above the control unit. A heat sensor is provided in the baking chamber. When the toaster oven is used as a toaster, the heat sensor detects the surface temperature of the slices of bread during the toasting operation and the toasting operation is controlled on the basis of the temperature detected by the heat sensor. When the toaster oven is used as an oven, the heat sensor regulates the supply of current to a plurality of heating elements to control the temperature of the air in the baking chamber. The control unit is provided with a knob for operating a cam actuator disposed behind the knob. The cam actuator selects a toasting mode in which the toaster oven operates as a toaster and a heating mode in which the toaster oven operates as an oven, and sets the corresponding operating conditions. However, since the interval between the successive baking cycles is not always the same and the temperature variation of the baking chamber varies between the baking cycles, this control unit is unable to control the toaster oven so that the baked condition is always the same.

SUMMARY OF THE INVENTION

Accordingly, an object of the present invention is to provide a toaster oven capable of baking articles of food always in a desired baked condition when the same is used as a toaster even if the baking cycle is repeated successively at any irregular intervals between the successive baking cycles, by detecting the baked condition of the articles with heat sensors.

Another object of the present invention is to provide a toaster oven having sensors protected from heat and soiling when the same is used as an oven, by closing heat guide opening for guiding heat to the sensors disposed in the baking chamber.

A further object of the present invention is to provide a toaster oven having sensors protected from heat and soiling when the same is used as an oven, by displacing the sensors from a position corresponding to a heat guide opening for guiding heat to the sensors disposed in the baking chamber.

In one aspect of the present invention, a toaster oven according to the present invention comprises baked condition sensors (36, 39), a guide tube (27) for guiding heat radiated from an article (23) being baked to the baked condition sensors (36, 39), comparing means for comparing the signal levels of the output signals of the baked condition sensors (36, 39) with a predetermined signal level, and a control unit (53) for controlling current supply to heating elements (16, 17) for baking the article, on the basis of the result of comparison.

In another aspect of the present invention, a toaster oven comprises baked condition sensors (36, 39) for detecting the baked condition of an article (23) being baked by sensing the heat radiated from the article (23), disposed outside a baking chamber (22) near a heat guide opening (21a) formed in the wall of the baking chamber (22) and capable of being opened only when the toaster oven is used as a toaster.

In a further aspect of the present invention, a toaster oven comprises a sensor unit (26) disposed outside a baking chamber (22) near a heat guide opening (21a), having at least baked condition sensors (36, 39) and a guide tube (27) for guiding the heat radiated from an article (23) being baked to the baked condition sensors (36, 39), and capable of being disposed opposite to the heat guide opening (21a) only when the toaster oven is used as a toaster.

Thus, according to the present invention, current supply to the heating elements (16, 17) is interrupted upon the coincidence of the signal levels of the output signals of the baked condition sensors (36, 39) with the predetermined signal level, the heat guide opening (21a) is opened only when the toaster oven is used as a toaster, and the sensor unit (26) is moved to a position opposite the heat guide opening (21a) only when the toaster oven is used as a toaster.

The above and other objects, features and advantages of the present invention will become more apparent from the following description of the preferred embodiments thereof taken in conjunction with the accompanying drawings.

DESCRIPTION OF THE PREFERRED EMBODIMENTS

Figure 1:
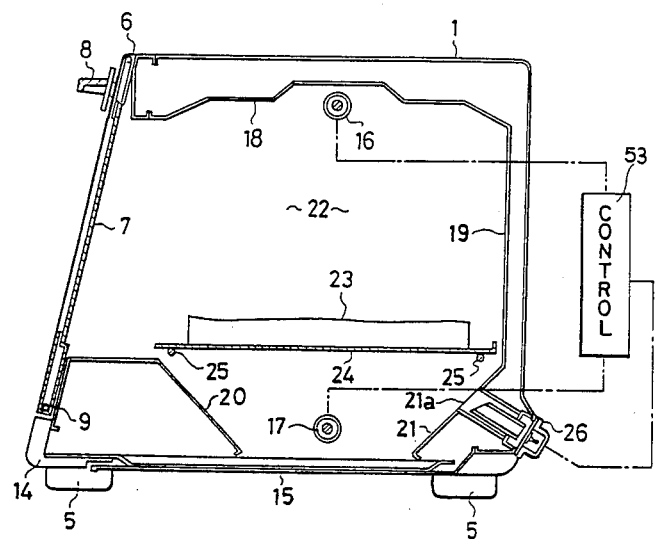
FIG. 1 is a sectional view of a toaster oven, in a first embodiment, according to the present invention.

Preferred embodiments of the present invention will be described hereinafter with reference to the accomapnying drawings, in which like reference characters designate like or corresponding parts throughout.

Figure 2:
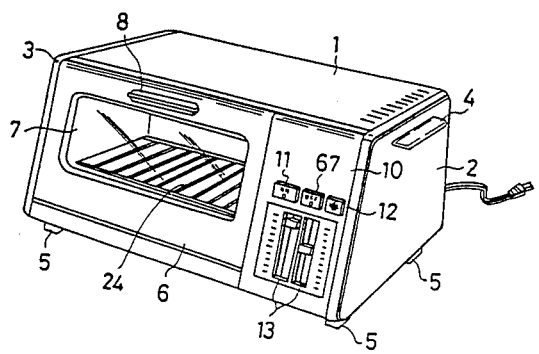
FIG. 2 is a perspective view of the toaster oven of FIG. 1, showing the external appearance of the same.

A first embodiment of the present invention is illustrated in FIGS. 1 to 11. Referring to FIGS. 1 and 2, there are shown a main plate 1 forming the upper and rear walls of the baking box of a toaster oven, side plates 2 and 3 attached to the opposite sids of the main plate 1, handles 4 attached to the side plates 2 and 3, respectively, legs 5 attached to the side plates 2 and 3, a door 6 provided with a glass window 7 in the central portion thereof and a door handle 8 in the upper portion thereof and pivotally supported on a hinge shaft 9 attached to the lower parts of the side plates 2 and 3, a control panel 10 disposed on right-hand side of the door 6 and provided with an automatic reset main switch 11, a break switch 67, power supply pilot lamp 12 and a baking condition setting lever 13, a bottom plate 14 forming the bottom wall of the baking box and having a door 15 covering an opening for removing crumbs of bread and chips of food from the baking box, an upper heater 16, and a lower heater 17.

An upper reflecting plate 18, a rear heat insulating plate 19 and lower reflecting plates 20 and 21 are provided in the baking box to reflect the heat radiated by the heaters 16 and 17 and to heat-insulate the baking box. The reflecting plates 18, 20 and 21, the heat insulating plate 19 and inner side plates, not shown, form a baking chamber 22. A grill 24 for suporting an ariticle 23 to be baked, such as a slice of bread, is supported detachably on supporting members 25 above the lower heater 17. The grill 24 moves forward and rearward as the door 6 is opened and closed, respectively.

A heat guide opening 21a is formed in the lower reflecting plate 21. A baked condition detector 26 is attached to the lower end of the main plate 1 so as to be located behind the heat guide opening 21a.

Figure 3:
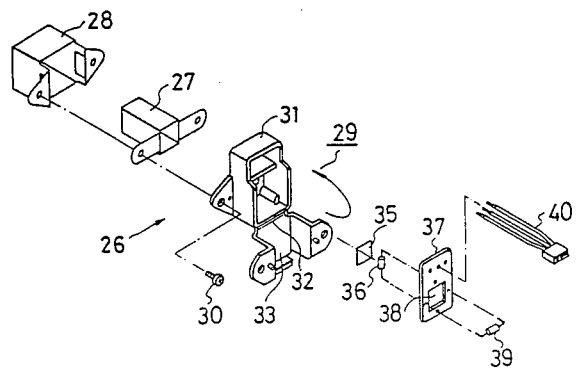
FIG. 3 is an exploded perspective view of a baked condition detector employed in the first embodiment.
Figure 4:
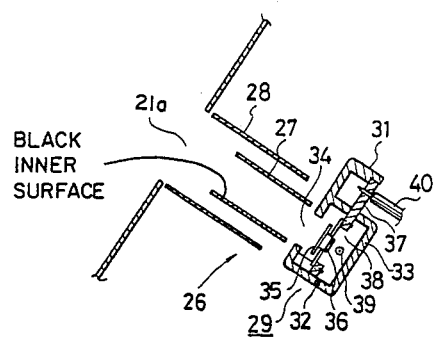
FIG. 4 is a sectional view of the baked condition detector of FIG. 3.

As illustrated in FIGS. 3 and 4, the baked condition detector 26 has a tubular guide consisting of an inner tube 27 and an outer tube 28. The inner tube 27 and the outer tube 28 are fixed to an insulating case 29, for example, a plastic case, with screws 30. The case 29 is an integral member consisting of a body 31 and a cover 33 joined to the body 31 with a self-hinge 32. A through hole 34 is formed in the central portion of the case 29 so as to communicate with the hollow interior of the inner tube 27. The body of a first diode 36, namely, a first thermosensitive element, is secured to the outer side of a heat receiving plate 35, and the lead wires of the first diode 36 are connected to an upper part and a lower part in one surface of a printed wiring board 37. A through hole 38 is formed in the printed wiring board 37 at a position corresponding to the first diode 36. A second diode 39, namely, a second thermosensitive element, is disposed on the outer side of the printed wiring board 37 so as to coincide with the through hole 38, and the lead wires of the second diode 39 are connected to a right part and a left part in the other surface of the printed wiring board 37. Connecting wires 40 for connecting the wiring of the printed wiring board 37 to a control circuit is connected to the wiring of the printed wiring board 37 in the upper portion of the same. The printed wiring board 37 mounted with the parts is fitted in the body 31 of the case 29, and then the cover 33 is turned up as indicated by arrow to cover the printed wiring board 37. The inner tube 27, the outer tube 28 and the case 29 are fixed to the main plate 1 with the screws 30.

Figure 5:
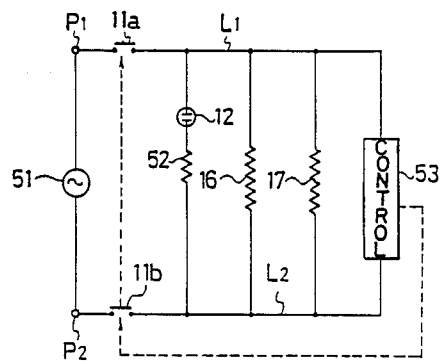
FIG. 5 is a diagram showing the general constitution of the electric circuit of the first embodiment.

Referring to FIG. 5, showing the general constitution of the electric circuit of the electric toaster oven, power supply terminals $P_1$ and $P_2$ are connected to a commercial AC power source 51. Power lines $L_1$ and $L_2$ are connected via the contacts 11a and 11b of a main switch 11 to the power supply terminals $P_1$ and $P_2$, respectively. A series connection of a resistor 52 and the power supply pilot lamp 12, the heater 16, the heater 17 and a control circuit 53 are connected to the power lines $L_1$ and $L_2$.

Figure 6:
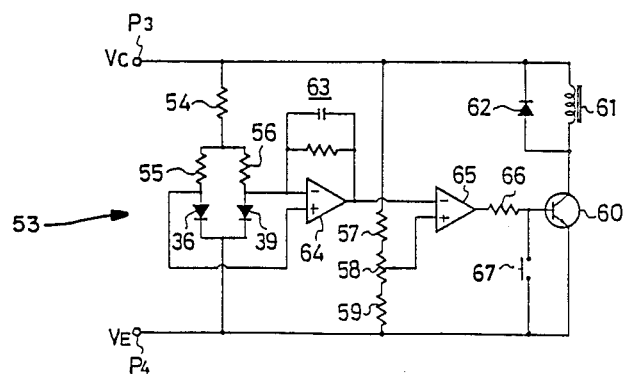
FIG. 6 is a diagram showing the constitution of a control circuit employed in the first embodiment.

The control circuit 53 has a DC power source connected to the AC power source 51 and capable of producing a voltage $+V_C$ and a voltage $+V_E$ at terminals $P_3$ and $P_4$, respectively. A circuit shown in FIG. 6 is connected to the terminals $P_3$ and $P_4$. This circuit includes a series connection of a resistor 54 and a parallel connection of a series connection of a resistor 55 and the first diode 36 and a series connection of a resistor 56 and the second diode 39, connected to the terminals $P_3$ and $P_4$. The first diode 36 and the second diode 39 are connected in the forward direction to the power source. A series connection of a resistor 57, a variable resistor 58 interlocked with the baking condition setting lever 13 and a resistor 59 is connected to the terminals $P_3$ and $P_4$. An npn transistor 60 and a solenoid 61 are connected to the terminals $P_3$ and $P_4$. A diode 62 for absorbing surge is connected in parallel to the solenoid 61. When energized, the solenoid 61 holds the contacts 11a and 11b of the main switch 11 closed and, when de-energized, releases the contacts 11a and 11b.

The junction of the resistor 55 and the first diode 36 is connected to the noninversion input terminal (+) of the operational amplifier 64 of a differential amplifier 63, while the junction of the resistor 56 and the second diode 39 is connected to the inversion input terminal (−) of the operational amplifier 64. The output terminal of the operational amplifier 64 is connected to the inversion input terminal (−) of a comparator 65. The variable terminal of the variable resistor 58 is connected to the noninversion input terminal (+) of the comparator 65. The output terminal of the comparator 65 is connected via a resistor 66 to the base of the transistor 60. An OFF-switch 67 is provided between the base and the emitter of the transistor 60. The operational amplifier 64, the comparator 65, the resistors 57 and 59, the variable resistor 58, the transistor 60 and the solenoid 61 constitute the control circuit.

When the main switch 11 is closed, current is supplied to the upper heater 16 and the lower heater 17 to heat the article to be baked, such as a slice of bread 23, placed on the grill 24, and thereby the temperature of the baking chamber 22 rises. The infrared rays radiated from one side of the slice of bread 23 travel through the heat guide opening 21a of the lower reflecting plate 21 and the inner tube 27 to the heat receiving plate 35. In the early stage of the baking cycle, the temperature of the heat receiving plate 35 is not very high, and hence the first diode 36 and the second diode 39 are substantially the same in temperature condition. Accordingly, there is little difference between the temperature-dependent output signal of the first diode 36 and that of the second diode 39 in the initial stage of the baking cycle. Incidentally, the temperature-dependent output characteristics of a silicon diode is in the range of $-2.0$ to $-2.5$ mV/°C.

While the difference between the output signals of the first diode 36 and the second diode 39 is small, the operational amplifier 64 provides a small output signal. Accordingly, the input signal given through the variable resistor 58 to the comparator 65 is greater than the input signal given from the operational amplifier 64 to the same. Thus, the comparator 65 provides a high-level (abbreviated to "H-level" hereinafter) output signal to make the transistor 60 turn on. Then, the solenoid 61 is energized, and thereby the contacts 11a and 11b of the main switch 11 is held. Thus, current is supplied continuously to the heaters 16 and 17 to toast the slice of bread 23. The intensity of the infrared rays radiated from the slice of bread 23 increases with the progress of toasting, and thereby the temperature of the heat receiving plate 35 rises. Accordingly, the first diode 36 is heated by the heat receiving plate 35 and the temperature of the first diode 36 becomes considerably higher than that of the second diode 39, and hence the voltage difference between the anode terminal of the first diode 36 and the anode terminal of the second diode 39 increases and the level of the output signal of the operational amplifier 64 increases. As soon as the slice of bread 23 has been toasted in a set baked condition, the level of the output signal of the comparator 65 is inverted from H-level to L-level (low-level). Consequently, the transistor 60 tuns off to interrupt the supply of current to the solenoid 61, and thereby the contacts 11a and 11b of the main switch 11 are opened. The baking condition can be regulated by varying the effective resistance of the variable resistor 58 through the operation of the baking condition setting lever 13. When the OFF-switch 67 is operated, the transistor 60 turns off immediately, so that current supply to the solenoid 61 is interrupted to open the contacts 11a and 11b of the main switch 11. Therefore, current supply to the heaters 16 and 17 can be interrupted at any optional time during the baking cycle to interrupt the baking cycle.

When the baking cycle is repeated successively several times to toast a plurality of slices of bread, the temperature of the baking chamber 22 becomes high and the slices of bread can be toasted in a short time. However, since the intensity of the infrared rays radiated from the slice of bread 23 is proportional to the baked condition of the slice of bread 23, the higher the temperature of the baking chamber 22, the sooner the output of the comparator 65 is inverted to open the contacts 11a and 11b of the main switch 11. Accordingly, all the slices of bread 23 are always toasted in a set baked condition, namely, in a desired baked condition.

Since the first diode 36 for detecting the baked condition of the slice of bread 23 is secured to the heat receiving plate 35 so as to be irradiated efficiently by the infrared rays radiated from the slice of bread 23, the baked condition can be detected correctly without being influenced by the ambient temperature.

Furthermore, since the first diode 36 and the second diode 39 are connected to one surface and the other surface of the printed wiring board 37, respectively, the first diode 36 and the second diode 39 can be fixed and positioned easily. Since the gap between the first diode 36 and the second diode 39 is dependent on the thickness of the printed wiring board 37, the size of the gap can be regulated appropriately by selectively deciding the thickness of the printed wiring board 37.

Furthermore, the rate of heat transfer to the second diode 39 can be regu-lated by appropriately deciding the size of the through hole 38 formed in the printed wiring board 37 between the first diode 36 and the second diode 39.

Still further, a compact assembly of the heat receiving plate 35, the diodes 36 and 39 and the insulating case 29 facilitates the attachement and replacement of these parts. The placement of the diodes 36 and 39 within the case 29 shields the diodes 36 and 39 from the ambient atmosphere, which improves the accuracy of detection.

Although the first embodiment is provided with one upper heater and one lower heater, the number and arrangement of the heaters are not limited thereto. For example, only one upper heater, only one lower heater, or a plurality of upper heaters and a plurality of lower heaters may be provided in the baking chamber 22. When only one upper heater is provided in the baking chamber 22, the baked condition detector 26 needs to be disposed in the upper part of the baking chamber 22. When the heaters are provided in both the upper and lower parts of the baking chamber 22, the baked condition detector 26 may be disposed at any position, provided that the baked condition detector 26 is exposed efficiently to the infrared rays radiated from one side of the slice of bread 23.

Figure 7:
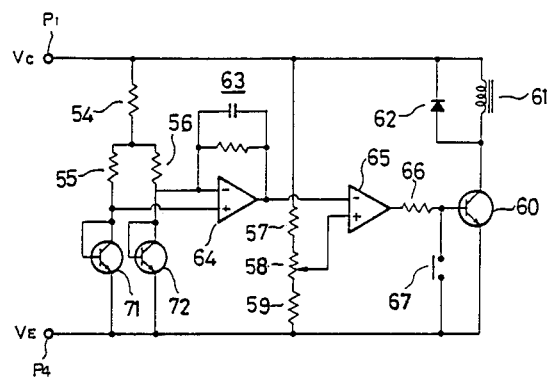
FIGS. 7 and 8 are diagrams showing modifications of the control circuit.

FIG. 7 shows a modification of the control circuit. This control circuit employs a first npn transistor 71 and a second npn transistor 72 for the first diode 36 and the second diode 39 or the control circuit 53 of FIG. 6. Since the collector and the base of each of the transistors 71 and 72 are interconnected, the functions of the transistors 71 and 72 are the same as cathode of the diodes 36 and 39 of the control circuit 53 of FIG. 6. As compared with securing the cylindrical first diode 36 to the heat receiving plate 35 as illustrated in FIGS. 9A and 9B, the square first transistor 71 can be more easily and firmly secured to the heat receiving plate 35 by placing the flat surface of the first transisotor 71 in contact with the heat receiving plate 35, and heat is transmitted from the heat receiving plate 35 to the first transistor 71 efficiently, so that the first transistor 71 functions stably. When the cylindrical diode 36 is used, the adjustment of inclination of the heat receiving plate 35 is difficult even when the diode 36 is fixed adhesively to the heat receiving plate 35, while the square transistor 71 having a flat surface facilitates the adjustment of the direction of the heat receiving plate 35.

Figure 8:
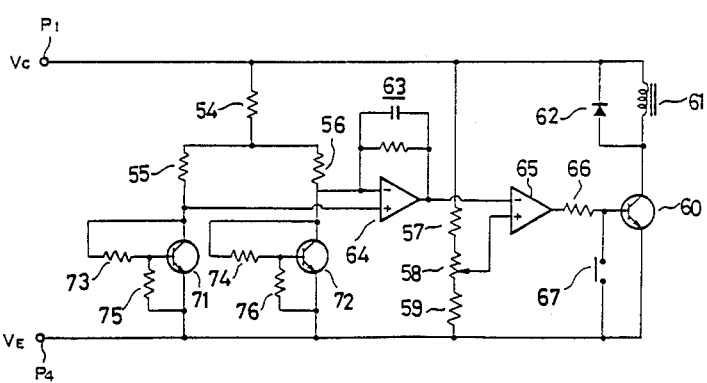
Figure 9:
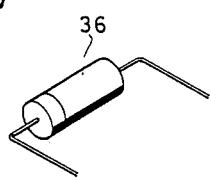
FIG. 9A is a perspective view of a diode.
FIG. 9B is a side elevation of a combination of the diode and a heat receiving plate.
FIG. 9C is a perspective view of a transistor.
FIG. 9D is a side elevation of a combination of the transistor and a heat receiving plate.
Figure 9:
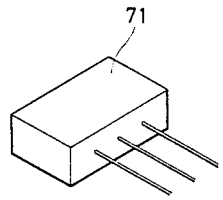
Figure 9:
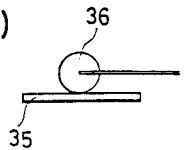
Figure 9:
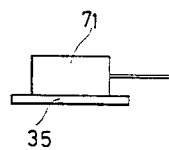

FIG. 8 illustrates another modification of the control circuit. In this modification, voltage amplifying resistors 73 and 74 are connected to the base and the collector of each of the first transistor 71 and the second transistor 72, resistors 75 and 76 are connected to the base and the emitter of each of the first transistor 71 and the second transistor 72, and the resistors 73, 74, 75 and 76 are combined with the first transistor 71 and the second transistor 72, respectively, by molding. Since the detection voltage is amplified by the voltage amplifying resistors 73 and 74, the output voltage is increased, and hence the control circuit is able to function stably even when the amplification factor of the operational amplifier 64 is small. Furthermore, the inner tube 27 of the baked condition detector 26 is exposed to the heat of the baking chamber 22 and the front end of the inner tube 27 is heated to a considerably high temperature. Therefore, it is preferable to form the inner tube 27 with a metallic plate. Since the maximum rated temperature $TJ_{max}$ of the junctions of the thermosensitive elements, namely, the first diode 36, the second diode 39, the first transistor 71 and the second transistor 72, in general, is in the range of 125° to 150° C., it is desirable to design the shape, particularly, the length and the cross-sectional area, of the inner tube 27 suitably so that the temperature of the junctions of the thermosensitive elements will not rise above the maximum rated temperature. In order to guide the infrared rays radiated from the article 23 being baked efficiently to the diodes 36 and 39 or the transistors 71 and 72, and the heat receiving plate 35, it is desirable that the wall thickness of the inner tube 27 is as thin as possible, desirably, not more than 0.3 mm. Since a thin steel plate is not strong enough and is liable to be deformed, it is desirable to form the inner tube 27 with a stainless steel plate or a spring steel plate; a spring stainless steel plate of a thickness on the order of 0.1 mm is particularly preferable. In order to avoid the discoloration of the inner surface of the inner tube 27 and unstable heat transfer attributable to the reflection of heat by the inner surface of the inner tube, it is preferable to finish at least the inner surface of the inner tube 27 in black by painting, plating or temper coloration.

The operating characteristics of the baked condition detector 26 in the normal operating mode for toasting a slice of bread or the like will be described hereinafter with reference to FIG. 10.

Figure 10:
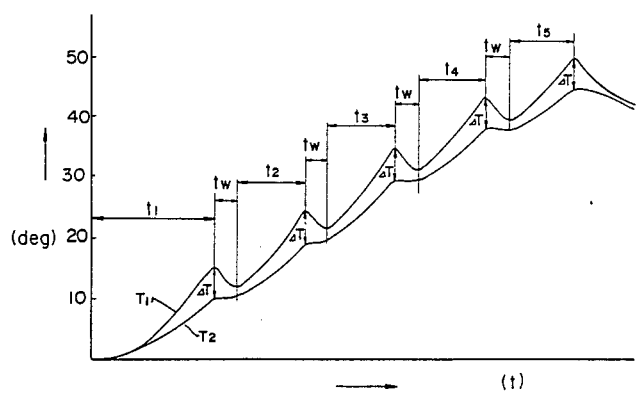
FIG. 10 is a graph showing the variation of the temperature of thermosensitive elements with baking time.

FIG. 10 shows the variation of the temperature of the thermosensitive elements with baking time in successively toasting slices of bread in the same toasted condition. Generally, the cycle time decreases as the baking cycle is repeated successively because the baking chamber 22 is cool at the start of the first baking cycle and the temperature of the baking chamber 22 rises as the baking cycle is repeated. In FIG. 10, $t_1$ to $t_2$ are the cycle times of the first baking cycle to the fifth baking cycle, respectively, $t_w$ is the interval between the successive baking cycles, a curve $T_1$ is the variation of the temperature of the first thermosensitive element (the first diode 36 or the first transistor 71), and a curve $T_2$ is the variation of the temperature of the second thermosensitive element (the second diode 39 or the second transistor 72). When the contacts 11a and 11b of the main switch 11 are closed, current is supplied to the upper heater 16 and the lower heater 17 to heat a slice of bread 23 and the baking chamber 22. The flux of infrared rays reaching the heat receiving plate 35 increases as the slice of bread 23 is toasted. Consequently, the temperature difference between the temperature $T_1$ of the first thermosensitive element and the temperature $T_2$ increases as shown in FIG. 10. The temperature difference, namely, difference in temperature characteristic between the first thermosensitive element (the diode 36 or the transistor 71) and the second thermosensitive element (the diode 39 or the transistor 72) is provided as a corresponding voltage difference, which is used for controlling the baking cycle. When the slice of bread 23 is toasted in a set baked condition, the level of the output signal of the operational amplifier 64 coincides with a level set by the variable resistor 58, and then the comparator 65 provides a L-level output signal to turn off the transistor 60. Consequently, the solenoid 61 is deenergized to open the contacts 11a and 11b of the main switch 11, and thereby the baking cycle is terminated. That is, the baking cycle is terminated upon the coincidence of the temperature difference between $T_1$ and $T_2$ with a predetermined temperature difference $\Delta T$ corresponding to a predetermined voltage difference. At the start of the subsequent baking cycle, the baking chamber 22 is warmed up and the respective temperatures of the first thermosensitive element 36 or 71 and the second thermosensitive element 39 or 71 are higher than those at the start of the first baking cycle. However, at the start of the subsequent baking cycle, the flux of infrared rays radiated from the next slice of bread 23 is less than that radiated from the preceding slice of bread 23 at the end of the preceding baking cycle, so that the heat receiving plate 35 radiates heat and the temperature of the heat receiving plate 35 tends to approach the ambient temperature, namely, the temperature $T_2$ of the second thermosensitive element 39 or 72. Consequently, the temperature difference between the temperatures $T_1$ and $T_2$ decreases, so that the subsequent baking cycle can be started. Then, the temperature difference between the temperatures $T_1$ and $T_2$ increases gradually and, upon the coincidence of the temperature difference with the predetermined temperature difference $\Delta T$, the baking cycle is terminated through the same process. The same temperature characteristics of the control circuit is repeated for the successive repetition of the baking cycle. FIG. 10 shows a mode of temperature variation of the first and second thermosensitive elements in successively toasting slices of bread at short intervals between the successive baking cycles. Ordinarily, the baking cycle is repeated successively at longer intervals between the successive baking cycles, and hence the respective temperatures of the first and second thermosensitive elements drops to the temperature at the start of the first baking cycle before starting the subsequent baking cycle.

Figure 11:
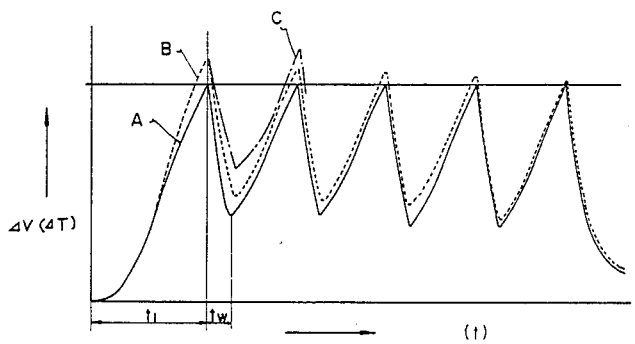
FIG. 11 is a graph showing the variation of the difference between the thermosensitive sensors in temperature with time.

FIG. 11 shows the variation of the voltage difference corresponding to the temperature difference between the first thermosensitive element 36 or 71 and the second thermosensitive element 36 or 72 with time. In FIG. 11, the voltage difference $\Delta V$ ($\Delta T$) is plotted on the Y-axis and baking time t is plotted on the X-axis. The scale of the X-axis of FIG. 11 is the same as that of the X-axis of FIG. 10. In FIG. 11, a curve A (continuous line) corresponds to the normal mode of operation of the toaster oven. The mode of operation of the toaster oven is influenced by the reflectivity of the inner surface of the inner tube 27.

It was prooved experimentally that a toaster oven provided with an inner tube 27 having an inner surface coated with black paint or plated in black, or an inner tube 27 formed with a thin stainless steel plate (0.3 mm or less in thickness) heat treated at a temperature in the range of 300° to 400° C. for fifteen minutes or longer operates in the normal mode of operation corresponding to the curve A; a toaster oven provided with an inner tube 27 formed with a thick steel plate or an inner tube 27 having an inner surface as rolled operates in a mode indicated by a curve B (broken line); a toaster oven provided with an inner tube 27 having a small heat capacity operates in a mode indicated by a curve C (alternate long and short dash line). When the mode of operation is as indicated by the curve B or C, slices of bread can not be toasted in the same toasted condition in the successive toasting of a plurality of slices of bread. The heat absorption and reflectivity of the inner are dependent on the condition of the inner surface, namely, the surface treatment of the inner surface, of the inner tube 27. In a toaster oven provided with an inner tube having an inner surface finished in black by surface treatment and a toaster oven provided with an inner tube having an unfinished inner surface, suppose that the rates of transfer of heat through the inner tubes to the heat receiving plates 35 and the thermosensitive elements 36 and 39, or 71 and 72 are $q_1$ and $q_1'$, the rates of transfer of heat to the respective inner tubes are $q_2$ and $q_2'$, the rates of secondary heat radiation from the respective inner tubes are $q_3$ and $q_3'$, and the amount of heat transferred to the parts other than the inner tubes, the heat receiving plates and the thermosensitive elements is negligible, respectively. Since $q_2 > q_2'$, (the inner tube having a black inner surface absorbs more heat and has less reflectivity than the inner tube having an untreated inner surface) and $q_3 > q_3'$, $Q < Q'$ where $Q = q_1 + q_3$, and $Q' = q_1' + q_3'$. That is, as indicated by the curve B in FIG. 11, the voltage difference (temperature difference) in the latter toaster oven is greater than that of the former toaster oven. The heat capacity of the inner tube 27 affects the mode of operation. When the inner tube 27 has a small heat capacity, the heat absorption and heat radiation of the inner tube 27 are equilibrated ($q_2 = q_3$) and the baking characteristics are not affected by the inner tube 27. However, when the baking cycle is repeated successively, the voltage difference varies with time as indicated by the curve C, and hence the baking operation is unstable. It was found through experiments that no problem occurs when the wall thickness of the inner tube is 0.3 mm or below.

A second embodiment of the present invention will be described hereinafter with reference to FIGS. 12 to 18, in which the parts of the second embodiment like or corresponding to those of the first embodiment are designated by the same reference characters and the description thereof will be omitted.

Figure 12:
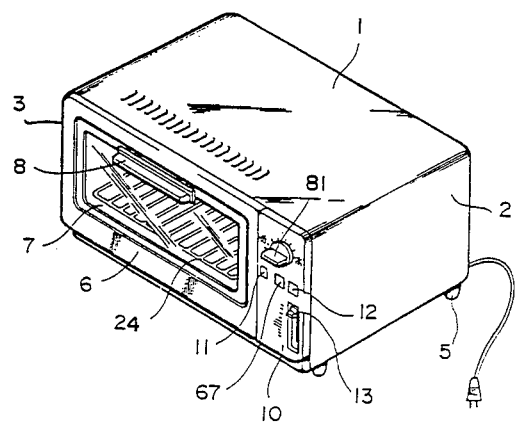
FIG. 12 is a perspective view of a toaster oven, in a second embodiment, according to the present invention, showing the external of the same.
Figure 13:
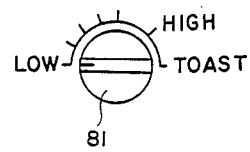
FIG. 13 is a front elevation of a selector switch employed in the second embodiment.
Figure 14:
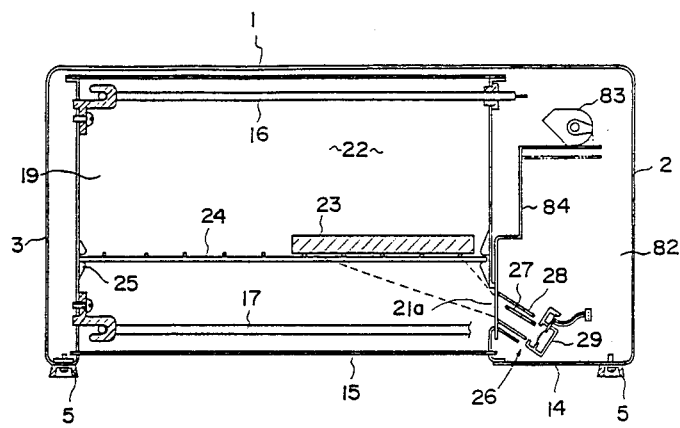
FIG. 14 is a sectional front elevation of the second embodiment.
Figure 15:
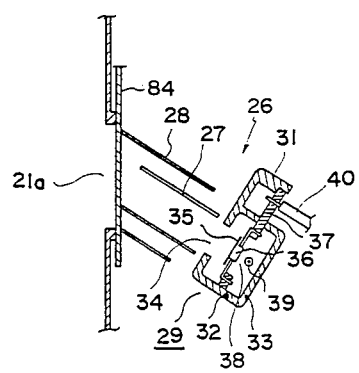
FIG. 15 is a sectional view of a baked condition detector employed in the second embodiment.
Figure 16:
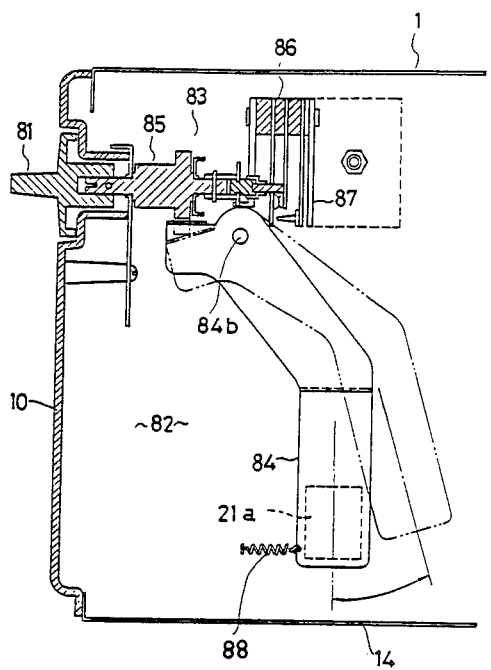
FIG. 16 is a sectional side elevation of a rotary member and a damper interlocked with the selector switch.

Referring to FIGS. 12 and 13, a selector knob 81 is provided on a control panel 10. The selector knob 81 has a toast position for setting the toaster oven for toasting slices of bread, and an oven position including temperature graduation for setting the toaster oven for operation as an oven. As best illustrated in FIG. 14, a chamber 82 is formed behind the control panel 10 on one side of a baking chamber 22. A baked condition detector 26 for detecting the heat radiated from the lower side of a slice of bread 23 and transferred thereto through a heat guide hole 21a, a rotary member 83 interlocked with the selector knob 81, and a damper 84 interlocked with the rotary member 83 are disposed within the chamber 82. As illustrated in FIG. 16, a damper cam 85 is joined to the rear end of the selector knob 81, a thermostat 86 is associated with the rear end of the damper cam 85, and the thermostat 86 is fixed at the rear end thereof to a supporting member 87. The damper 84 is disposed below the rotary member 83 and is supported on a shaft 84b for swing motion. The damper 84 is formed substantially in an inverted L-shape. When the selector knob 81 is turned to the toast position, the projection of the damper cam 85 pushes the short arm of the damper 84 to turn the damper 84 counterclockwise from a position indicated by continuous lines to a position indicated by alternate long and two short dashes lines in FIG. 16, so that the heat guide opening 21a for guiding heat to the baked condition detector 26 is opened. When the selector knob 81 is turned to the oven position, the projection of the damper cam 85 is separated from the short arm of the damper 84 to allow the damper to be turned to the original position indicated by the continuous lines, by a spring 88, so that the heat guide opening 21a is closed.

The thermostat 86 has a plurality of contacts for different operating temperatures. When the selector knob is adjusted to a temperature scale in the oven position, the corresponding contact of the thermostat is closed.

Thus, the heat guide opening 21a is opened when the toaster oven is used as a toaster, while the heat guide opening 21a is closed with the damper 84 when the toaster oven is used as an oven for roasting meat or the like. Accordingly, the baked condition detector 26 is shielded from heat of high temperature which may exert an injurious influence on the baked condition detector 26. Furthermore, since the heat guide opening 21a is closed with the damper while the toaster oven is used as an oven, the baked condition detector 26 is protected from soiling by oils and juices sputtered from the article being roasted in the baking chamber 22. Since the damper 84 is controlled by the selector knob 81, which is provided in every conventional toaster oven for selecting the mode of operation, any additional means for controlling the damper 84 is unnecessary, and hence it is not necessary to provide additional parts for controlling the damper 84. Furthermore, since the damper 84 is interlocked with the selector switch, there is no possibility that the heat guide opening 21a is opened erroneously when the toaster oven is used as an oven.

Figure 17:
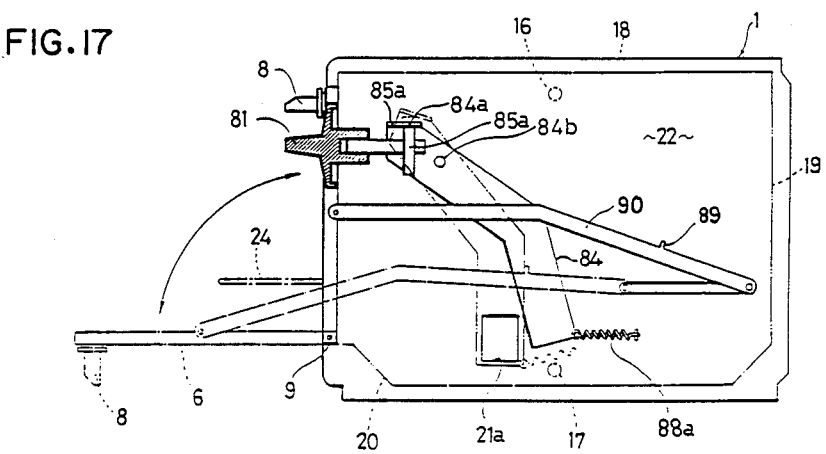
FIG. 17 is a sectional side elevation of the toaster oven of the second embodiment.

FIG. 17 illustrates a modification of the second embodiment. In this modification, a portion of the circumference of the damper cam 85 joined to the rear end of the selector knob 81 is cut to form a flat surface 85a which engages a damper 84. The upper end of the damper 84 is bent to form a lug 84a. The damper 84 is supported pivotally at a position near the upper end thereof on a shaft 84b so that the lower end thereof is able to cover the heat guide opening 21a. A spring 88a is connected to the lower end of the damper 84 to bias the damper 84 counterclockwise. A projection 89 is formed formed in the rear portion of a sliding member 90 connected to the door 6 so as to engage the rear edge of the damper 84 and turns the damper 84 to close the heat guide opening 21a when the door 6 is opened. When the door 6 is opened, the grill 24 is pulled out by the sliding member 90. In this state, the lug 84a of the damper 84 is in engagement with the circular portion of the damper cam 85, so that the heat guide opening 21a is covered with the damper 84. After placing an article to be baked on the grill 24, the door 6 is closed, and thereby the grill 24 is returned into the baking chamber 22. Then, the selector knob 81 is operated. When the selector knob 81 is adjusted to the toast position, the flat surface 85a of the damper cam 85 engages the lug 84a of the damper 84, the damper 84 is turned counterclockwise by the spring 88 to open the heat guide opening 21a. When the door 6 is opened to take out the toasted slice of bread 23 and to put the next slice of bread 23 on the grill 24, the damper 84 is turned clockwise against the resilience of the spring 88 by the projection 89 to close the heat guide opening 21a, so that the baked condition detector 26 is shielded from the infrared rays radiated from the upper heater 16 and the lower heater 17, in taking out the toasted slice of bread 23 and putting the next slice of bread 23 in the baking chamber 22, so that the levels of the respective output signals of the first diode 36 and the second diode 39 can be restored quickly to the initial levels, respectively.

After putting the next slice of bread 23 on the grill 24, the door 6 is closed again. Then, the projection 89 is moved away from the damper 84 to allow the spring 88a to move the damper 84 away from the heat guide opening 21a, so that the baked condition detector 26 which has been restored to its initial state is irradiated by the infrared rays radiated from the next slice of bread 23.

Thus, the heat guide opening 21a is opened only when the door 6 is closed and the selector knob is adjusted to the toast position and the heat guide opening 21a is closed with the damper 84 in replacing the slice of bread 23 to shield the baked condition detector 26 from the infrared rays radiated from infrared ray radiating matters other than the slice of bread 23, such as the upper reflecting plate 18, the upper heater 16 and the lower heater 17. Accordingly, the baked condition detector 26 can be restored quickly to its initial state, so that erroneous operation such as insufficient toasting is prevented. Furthermore, since the heat guide opening 21a is closed with the damper 84 when the door 6 is opened, the inadvertent insertion of foreign matters into the baked condition detector 26 or the damage of the baked condition detector 26 due to inadvertent cleaning operation are prevented. The damper 84 is controlled for closing and opening the heat guide opening 21a in combination with the opening and closing operation of the door 6 by inexpensive means, namely, the projection 89 formed in the sliding member 90. Since the heat guide opening 21a is always closed with the damper 84 while the selector knob 81 is set at a position other than the toast position, the soiling and excessive heating of the baked condition detector 26 are prevented and the causes of malfunction of the baked condition detector 26 is eliminated.

Various modifications of the second embodiment are possible. For example, the damper 84 may be controlled by electric driving means including, for example, an electromagnet or an electric motor, which is energized when the selector knob 81 is set at the toast position with the door 6 closed to move the damper 84 so that the heat guide opening 21a is opened and is de-energized when the door is opened to allow the damper to close the heat guide opening 21a; a push button selector may be employed instead of the selector knob; and the baked condition detector 26 may be of the thermocouple type.

A third embodiment of the present invention will be described hereinafter with reference to FIGS. 18 to 22, in which the parts of the third embodiment like or corresponding to those of the first and second embodiments are designated by the same reference characters and the description thereof will be omitted.

Figure 18:
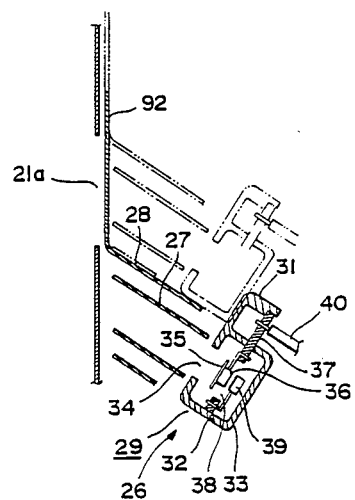
FIGS. 18 to 20 are fragmentary sectional views showing the constitution of a toaster oven, in a third embodiment, according to the present invention.
Figure 19:
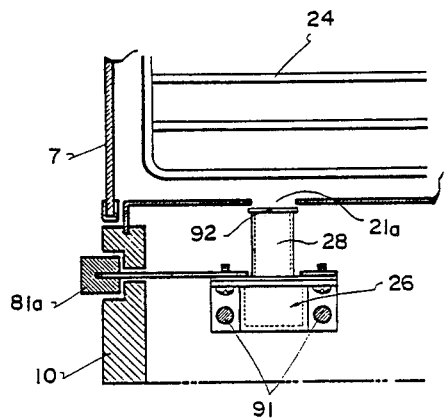
Figure 20:
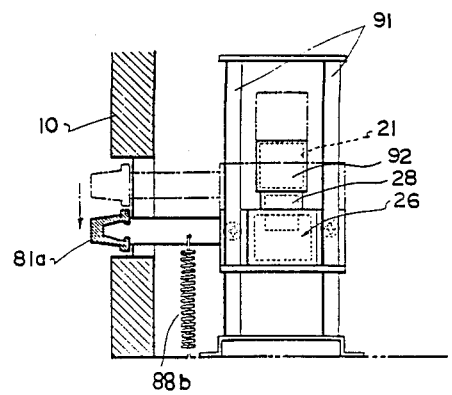
Figure 21:
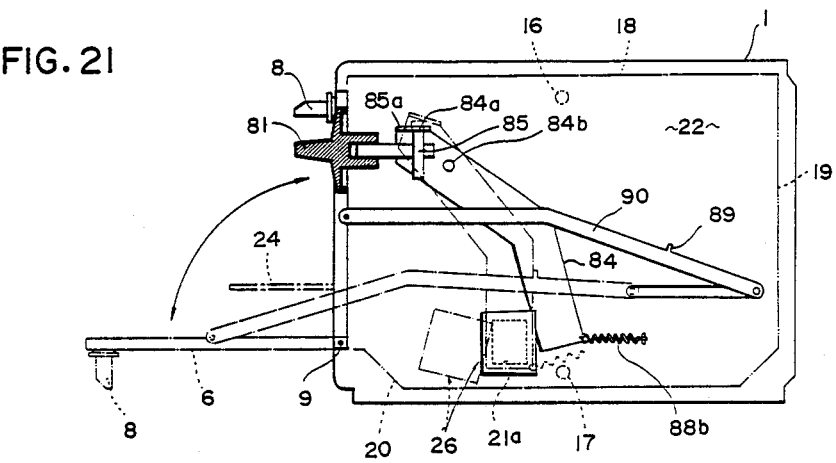
FIGS. 21 and 22 are sectional views of a modification of the third embodiment of the present invention.
Figure 22:
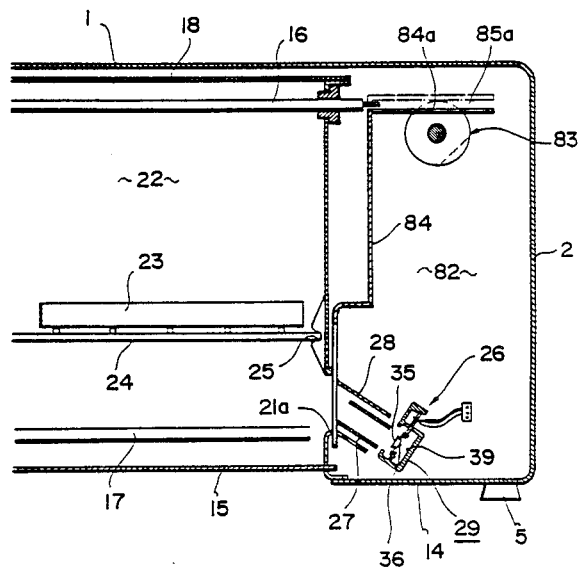

Referring to FIGS. 18 to 20, the baked condition detector 26 is combined with a sliding selector knob 81a. When the sliding selector knob 81a is set at the toast position, namely, an upper position indicated by alternate long and short dash lines in FIG. 20, the baked condition detector 26 is moved along guide rails 91 so that the inlet openings of the guide tubes 27 and 28 of the baked condition detector 26 are placed in front of the heat guide opening 21a. When the selector knob 81a is set at the oven position, namely, a lower position indicated by continuous lines in FIG. 20, the baked condition detector 26 is moved along the guide rails 91 to a position where the inlet openings of the guide tubes 27 and 28 are deviated from the heat guide opening 21a and is held at the position by a spring 88b, while a shutter 92 combined with the baked condition detector 26 closes the heat guide opening 21a. When the selector knob 81a is located at the upper position, the same is held in place with a stopper, not shown In a modification shown in FIGS. 21 and 22, the baked condition detector 26 is attached to the lower end of a damper 84 similar to the damper shown in FIG. 17. When the toaster oven is used as a toaster, the damper 84 opens the heat guide opening 21a and brings the inlet openings of the guide tubes 27 and 28 of the baked condition detector 26 to a position infront of the heat guide opening 21a as indicated by continuous lines in FIG. 21. When the toaster oven is used as an oven, the damper 84 closes the heat guide opening 21a and moves the baked condition detector 26 away from the heat guide opening 21a as indicated by alternate long and short dash lines in FIG. 21. In the embodiments described herein, means for linearly moving the baking condition detector 26 in vertical directions or in horizontal directions is employed. It is also possible to employ means for turning the baked condition detector 26.

As apparent from what has been described hereinbefore, the electric toaster oven according to the present invention is capable of baking articles successively always in a desired baked condition even if the interval between the successive baking cycles is irregular, and is capable of protecting the baked condition detector from soiling and excessive heat by opening the heat guide opening or by locating the baked condition detector opposite the heat guide opening only when the electric toaster oven is used as a toaster.

Although the present invention has been described in its preferred forms with a certain degree of particularity, it is to be understood that many variations and changes are possible in the invention without departing from the scope and spirit thereof.

What is claimed is:

1. An electric toaster oven for cooking an article placed on a grill in a baking chamber by heating the article with a heater or heaters disposed in the baking chamber, which comprises: a plate forming part of the wall of the baking chamber and having a normally closed heat guide opening; a baked condition detector disposed outside the baking chamber and opposite to the heat guide opening and capable of detecting the heat radiated from the article and transferred thereto through the heat guide opening to detect the baked condition of the article; and a damper which opens the heat guide opening only when the electric toaster oven is used as a toaster and closes the heat guide opening automatically when the electric toaster oven is not used as a toaster.

2. An electric toaster oven as recited in claim 1, wherein said damper is interlocked with a selector knob for selectively changing the mode of controlling the heater or heaters according to the mode of operation of the electric toaster oven as a toaster or as an oven.

3. An electric toaster oven as recited in claim 1, wherein said damper is interlocked with a door of the baking chamber for putting the article into and taking out the article from the baking chamber so as to close the heat guide opening when the door is opened.

4. An electric toaster oven for cooking an article placed on a grill in a baking chamber by heating the article with a heater or heaters disposed in the baking chamber, which comprises: a plate forming part of the wall of the baking chamber and having a heat guide opening; and a detecting unit disposed outside the baking chamber, comprising a baked condition detector capable of detecting the heat radiated from the article and transferred thereto through the heat guide opening to detect the baked condition of the article and a tubular guide for guiding the heat radiated from the article to the baked condition detector, said tubular guide automatically moving so that an inlet opening of the tubular guide is disposed opposite to the heat guide opening only when the electric toaster oven is used as a toaster.

5. An electric toaster oven as recited in claim 4, wherein said detecting unit is interlocked with a selector knob for selectively changing the mode of controlling the heater or heaters according to the mode of operation of the electric toaster oven as a toaster or as an oven.

6. An electric toaster oven as recited in claim 4, wherein said detecting unit is interlocked with a door of the baking chamber for putting the article into and taking out the article from the baking chamber therethrough so that the detecting unit is displaced from a position opposite the heat guide opening when the door is opened.

7. An electric toaster oven for cooking an article placed on a grill in a baking chamber by heating said article with a heater or heaters disposed in said baking chamber, said oven comprising:

a plate forming part of the wall of said baking chamber and having a heat guide opening;

a movable detecting unit disposed normally at a shielded position outside said baking chamber, away from said heat guide opening, said detecting unit including a baked condition detector capable of detecting the heat radiated from said article and transferred thereto and a tubular guide for guiding the heat radiated from said article to said baked condition detector; and means for automatically moving said detecting unit from said shielded position to a detecting position where the inlet opening of said tubular guide is positioned opposite said heat guide opening when said oven is used as a toaster and from said detecting position to said shielded position when said oven ceases to be used as a toaster.

8. An electric toaster oven as recited in claim 7, wherein said detecting unit is interlocked with a selector knob for selectively changing the mode of controlling said heater or heaters mode of operation of said electric toaster oven as a toaster or as an oven.

9. An electric toaster oven as receited in claim 7, wherein said detecting unit is interlocked with a door of said baking chamber for putting said article into and taking out said article from said baking chamber therethrough so that said detecting unit is moved from said detecting position when said door is opened.

* * * * *